US012027117B2

(12) United States Patent
Wetherell et al.

(10) Patent No.: US 12,027,117 B2
(45) Date of Patent: Jul. 2, 2024

(54) PIXEL SCREENING AND REPAIR

(71) Applicant: Apple Inc., Cupertino, CA (US)

(72) Inventors: John T. Wetherell, San Jose, CA (US); Cheuk Chi Lo, Belmont, CA (US); Chun-Yao Huang, San Jose, CA (US); Lingtao Wang, Cupertino, CA (US); Derek Keith Shaeffer, Redwood City, CA (US); Henry C. Jen, Los Altos, CA (US); Hasan Akyol, Mountain View, CA (US); Xuebei Yang, Fremont, CA (US); Chung-Lun Edwin Hsu, San Jose, CA (US); Patrick Bryce Bennett, San Leandro, CA (US); Chun-Ming Tang, San Jose, CA (US); Yingkan Lin, San Jose, CA (US); Sheng Zhang, San Jose, CA (US); Chaohao Wang, Sunnyvale, CA (US); Runjie Xu, Stanford, CA (US); Shingo Hatanaka, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/472,322

(22) Filed: Sep. 10, 2021

(65) Prior Publication Data

US 2022/0101790 A1 Mar. 31, 2022

Related U.S. Application Data

(60) Provisional application No. 63/083,681, filed on Sep. 25, 2020.

(51) Int. Cl.
*G09G 3/3233* (2016.01)

(52) U.S. Cl.
CPC ... *G09G 3/3233* (2013.01); *G09G 2300/0452* (2013.01); *G09G 2320/0233* (2013.01); *G09G 2320/0693* (2013.01); *G09G 2330/10* (2013.01); *G09G 2360/145* (2013.01)

(58) Field of Classification Search
CPC ......... G09G 3/3233; G09G 2300/0452; G09G 2320/0233; G09G 2320/0693; G09G 2330/10; G09G 2360/145
See application file for complete search history.

(56) References Cited

U.S. PATENT DOCUMENTS

| | | | | |
|---|---|---|---|---|
| 10,810,918 | B2 | 10/2020 | Hwang | |
| 10,916,198 | B2 | 2/2021 | Lin et al. | |
| 2005/0025369 | A1 * | 2/2005 | Shah .................... | H04N 19/507<br>375/E7.133 |

(Continued)

*Primary Examiner* — Amare Mengistu
*Assistant Examiner* — Gloryvid Figueroa-Gibson
(74) *Attorney, Agent, or Firm* — Fletcher Yoder, P.C.

(57) ABSTRACT

Systems and methods may reduce or eliminate image artifacts due to a defective pixel of an electronic display. An electronic display may include pixels that respectively include a self-emissive element, pixel drive circuitry that supplies a pixel drive current to drive the self-emissive element, and signal routing circuitry that reduces or eliminates a visual artifact due to a defective pixel among the pixels. The signal routing circuitry may do this by turning off the self-emissive element, supplying image data from the pixel drive circuitry to a first adjacent pixel, or receiving image data from other pixel drive circuitry from the first adjacent pixel or a second adjacent pixel.

20 Claims, 14 Drawing Sheets

(56) References Cited

U.S. PATENT DOCUMENTS

| | | | | |
|---|---|---|---|---|
| 2006/0066547 | A1* | 3/2006 | Nitta | G09G 3/3406 345/88 |
| 2008/0309602 | A1* | 12/2008 | Hwang | G09G 3/006 345/98 |
| 2011/0128309 | A1* | 6/2011 | Miyazaki | H04N 9/68 345/690 |
| 2011/0227958 | A1 | 9/2011 | Park et al. | |
| 2015/0154933 | A1* | 6/2015 | Bae | G09G 3/3611 345/618 |
| 2015/0161943 | A1* | 6/2015 | Shim | G09G 3/3225 345/76 |
| 2017/0069273 | A1* | 3/2017 | Park | G09G 3/3233 |
| 2017/0243562 | A1* | 8/2017 | Hu | G09G 3/2092 |
| 2019/0012965 | A1* | 1/2019 | Fu | H10K 59/131 |
| 2021/0097907 | A1* | 4/2021 | Xu | G09G 3/3607 |

* cited by examiner

PIXEL SCREENING AND REPAIR

CROSS-REFERENCE TO RELATED APPLICATIONS

This application is a non-provisional application claiming priority to U.S. Provisional Application No. 63/083,681, entitled "PIXEL SCREENING AND REPAIR," filed Sep. 25, 2020, which is hereby incorporated by reference in its entirety for all purposes.

SUMMARY

The present disclosure generally relates to electronic displays and, more particularly, to reducing or eliminating image artifacts due to defective pixels in an electronic display.

Flat panel displays, such as light-emitting diode (LED) displays or organic-LED (OLED) displays, are commonly used in a wide variety of electronic devices, including such consumer electronics such as televisions, computers, and handheld devices (e.g., cellular telephones, audio and video players, gaming systems, and so forth). Such display panels typically provide a flat display in a relatively thin package that is suitable for use in a variety of electronic goods. In addition, such devices may use less power than comparable display technologies, making them suitable for use in battery-powered devices or in other contexts where it is desirable to minimize power usage.

LED displays typically include picture elements (e.g., pixels) arranged in a matrix to display an image that may be viewed by a user. Individual pixels of an LED display may generate light as current is applied to each pixel. Current may be applied to each pixel by programming a voltage to the pixel that is converted by circuitry of the pixel into the current. On occasion, however, a pixel of an electronic display may not operate as desired (e.g., may be defective).

Accordingly, the systems and methods of this disclosure may compensate for pixels that may not behave as expected to reduce or eliminate image artifacts that would otherwise arise. For example, signal routing circuitry of pixels of the electronic display may route around certain parts of pixels that may malfunction (e.g., are broken, are non-functional, are functional but do not function as normally expected, operate substantially differently from other components in the display). Additionally or alternatively, processing circuitry may adjust image data to reduce the appearance of a malfunctioning pixel by brightening a dark defective pixel or reducing a brightness of a bright defective pixel.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings described below.

DETAILED DESCRIPTION OF SPECIFIC EMBODIMENTS

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles “a,” “an,” and “the” are intended to mean that there are one or more of the elements. The terms “comprising,” “including,” and “having” are intended to be inclusive and mean that there may be additional elements other than the listed elements. Additionally, it should be understood that references to “one embodiment” or “an embodiment” of the present disclosure are not intended to be interpreted as excluding the existence of additional embodiments that also incorporate the recited features. Furthermore, the phrase A “based on” B is intended to mean that A is at least partially based on B. Moreover, the term “or” is intended to be inclusive (e.g., logical OR) and not exclusive (e.g., logical XOR). In other words, the phrase A “or” B is intended to mean A, B, or both A and B.

Electronic displays are ubiquitous in modern electronic devices. As electronic displays gain ever-higher resolutions and dynamic range capabilities, image quality has increasingly grown in value. In general, electronic displays contain numerous picture elements, or “pixels,” that are programmed with image data. Each pixel emits a particular amount of light based at least in part on the image data. By programming different pixels with different image data, graphical content including images, videos, and text can be displayed.

Figure 1:
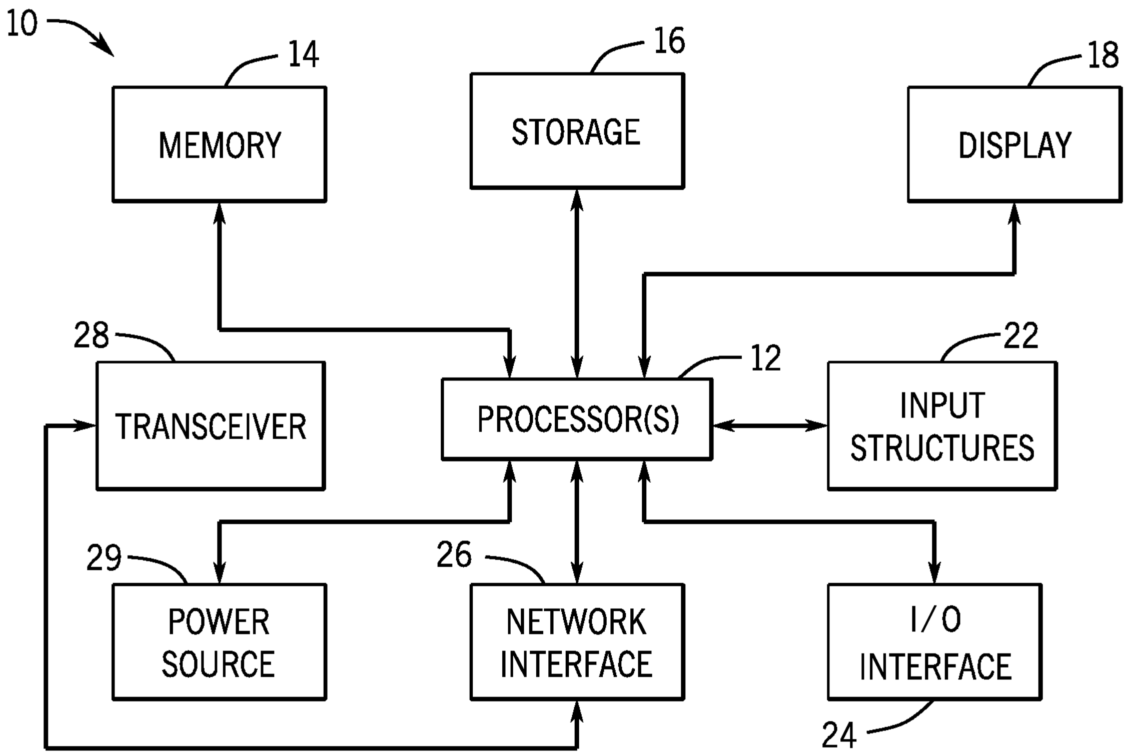
FIG. 1 is a block diagram of an electronic device, according to an embodiment of the present disclosure.
Figure 2:
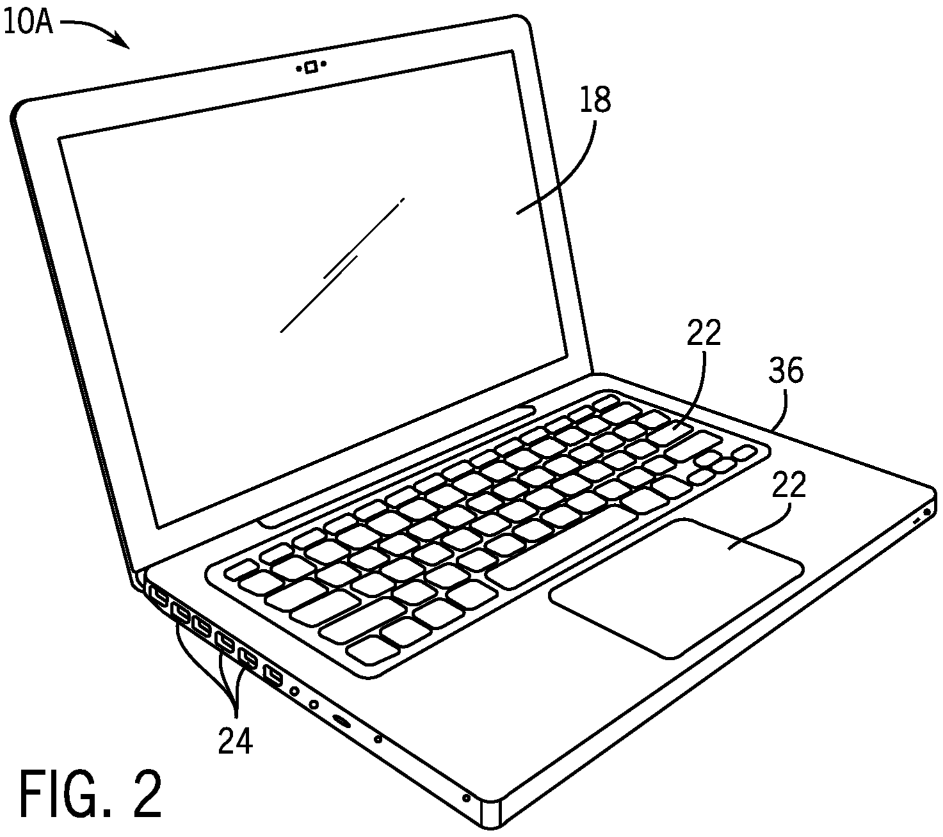
FIG. 2 is a perspective view of a notebook computer representing an embodiment of the electronic device of FIG. 1.
Figure 4:
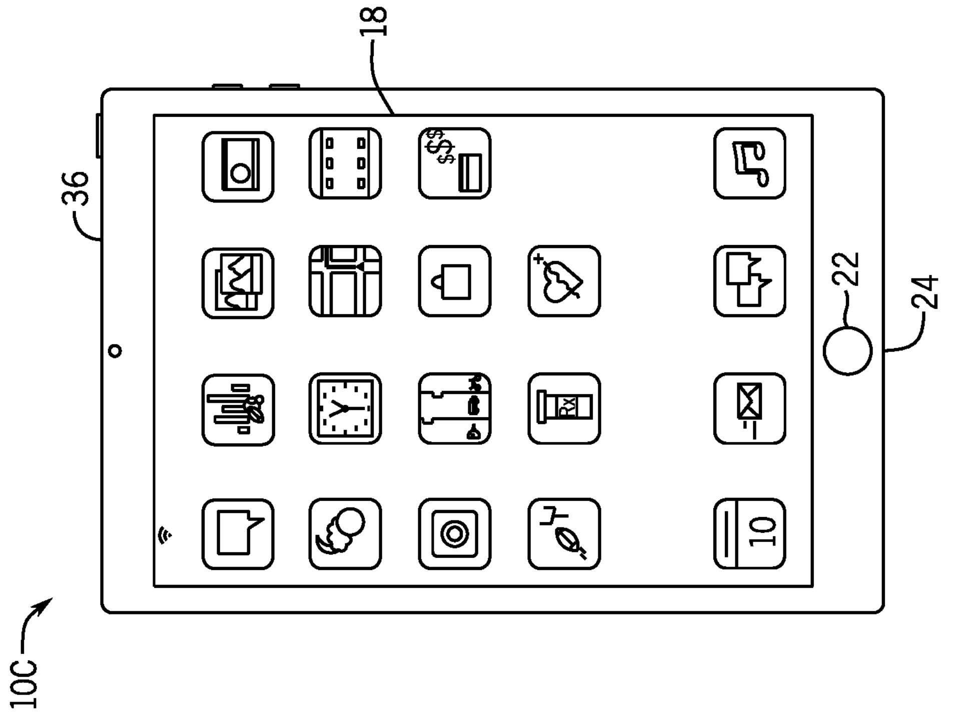
FIG. 4 is a front view of another handheld device representing another embodiment of the electronic device of FIG. 1.
Figure 3:
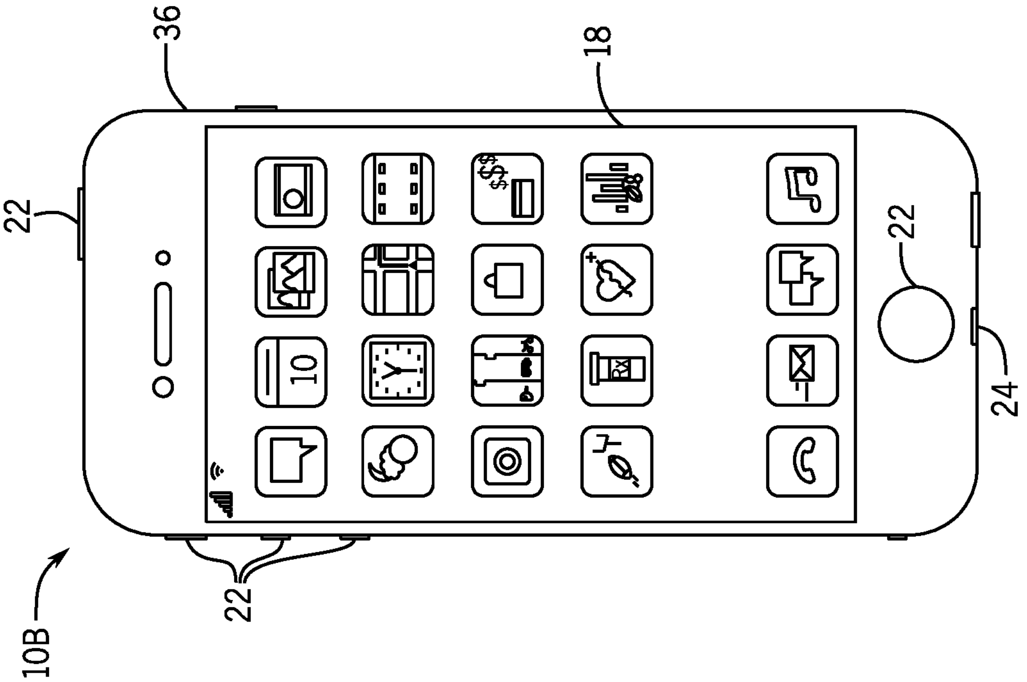
FIG. 3 is a front view of a handheld device representing another embodiment of the electronic device of FIG. 1.
Figure 5:
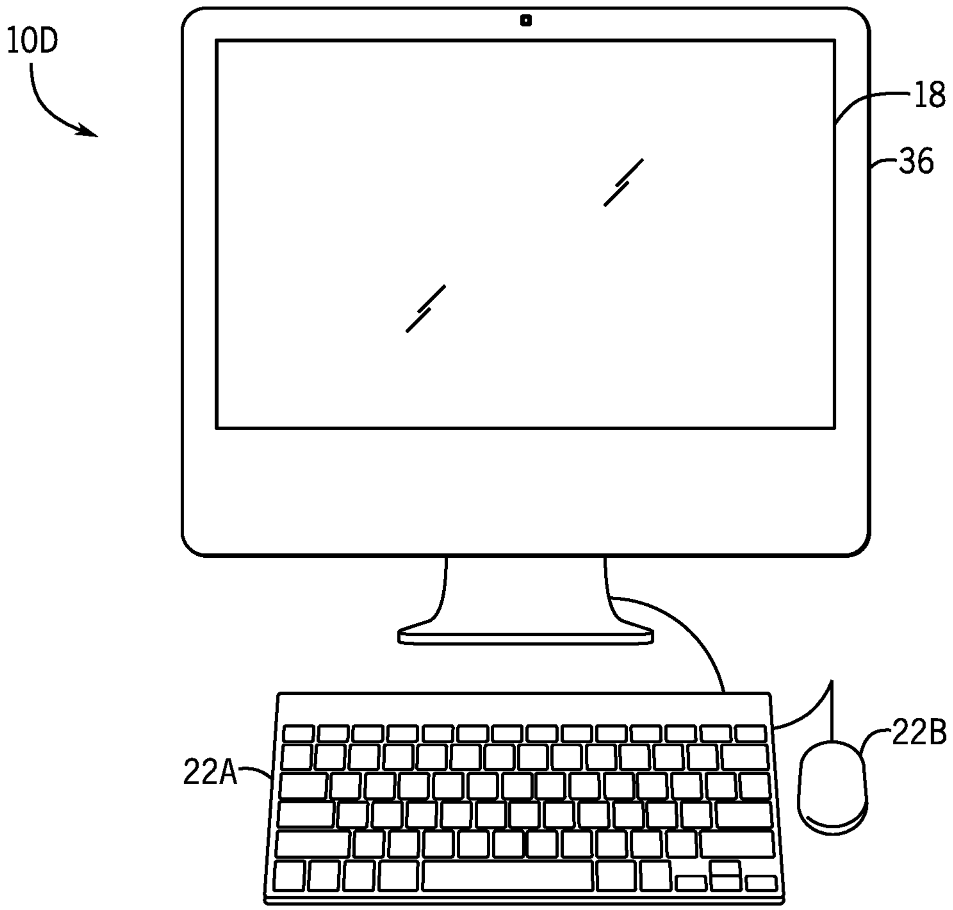
FIG. 5 is a front view of a desktop computer representing another embodiment of the electronic device of FIG. 1.
Figure 6:
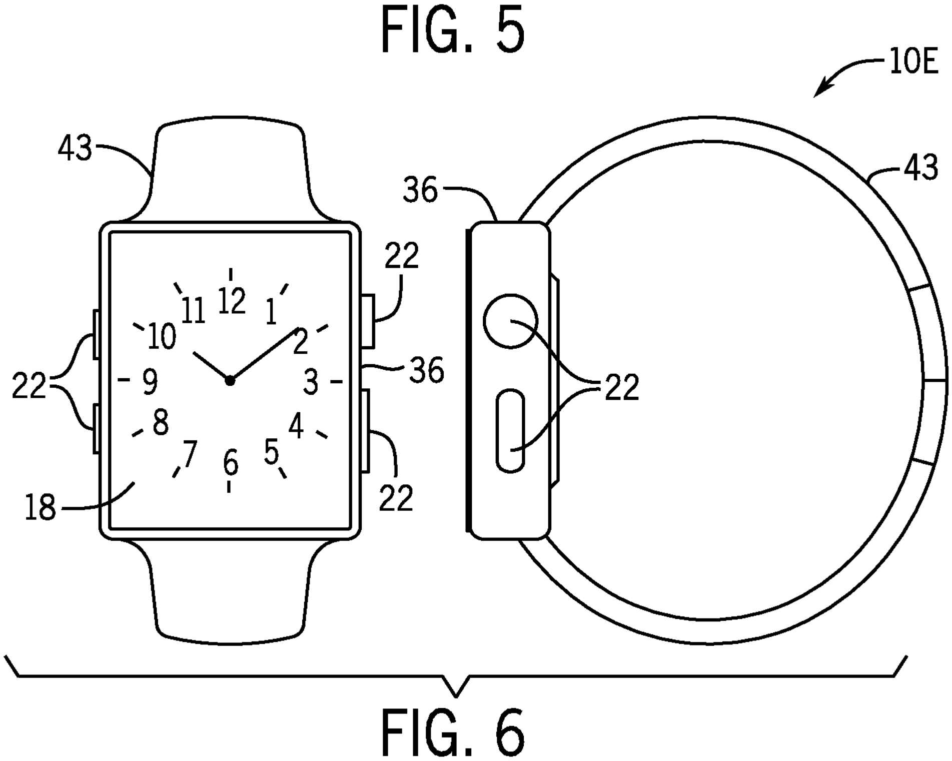
FIG. 6 is a perspective view of a wearable electronic device representing another embodiment of the electronic device of FIG. 1.

Electronic displays contain components that, due to variations in manufacturing, could behave differently than expected. This undesirable behavior is commonly referred to as a defect. Defective pixels could be brighter than expected, darker than expected, or inoperable. Accordingly, the techniques and systems described below may be used to test and compensate for functionality of various components of the display to account for such defects. Pixel circuitry is coupled to each pixel of the display. The pixel circuitry may compensate for one or more components of the display that malfunction (e.g., are broken, brighter than expected, darker than expected, or inoperable). For example, signal routing circuitry of pixels of the electronic display may route around certain parts of pixels that may malfunction (e.g., are broken, are non-functional, are functional but do not function as normally expected, operate substantially differently from other components in the display). Additionally or alternatively, processing circuitry may adjust image data to reduce the appearance of a malfunctioning pixel by brightening a dark defective pixel or reducing a brightness of a bright defective pixel With this in mind, a block diagram of an electronic device 10 is shown in FIG. 1. As will be described in more detail below, the electronic device 10 may represent any suitable electronic device, such as a computer, a mobile phone, a portable media device, a tablet, a television, a virtual-reality headset, a vehicle dashboard, or the like. The electronic device 10 may represent, for example, a notebook computer 10A as depicted in FIG. 2, a handheld device 10B as depicted in FIG. 3, a handheld device 10C as depicted in FIG. 4, a desktop computer 10D as depicted in FIG. 5, a wearable electronic device 10E as depicted in FIG. 6, or a similar device.

The electronic device 10 shown in FIG. 1 may include, for example, a processor core complex 12, a local memory 14, a main memory storage device 16, an electronic display 18, input structures 22, an input/output (I/O) interface 24, network interfaces 26, and a power source 29. The various functional blocks shown in FIG. 1 may include hardware elements (including circuitry), software elements (including machine-executable instructions stored on a tangible, non-transitory medium, such as the local memory 14 or the main memory storage device 16) or a combination of both hardware and software elements. It should be noted that FIG. 1 is merely one example of a particular implementation and is intended to illustrate the types of components that may be present in electronic device 10. Indeed, the various depicted components may be combined into fewer components or separated into additional components. For example, the local memory 14 and the main memory storage device 16 may be included in a single component.

The processor core complex 12 may carry out a variety of operations of the electronic device 10, such as causing the electronic display 18 to perform display panel sensing and using the feedback to repair a detected defect in the circuitry of the electronic display 18 and/or adjust image data to be displayed on the electronic display 18. The processor core complex 12 may include any suitable data processing circuitry to perform these operations, such as one or more microprocessors, one or more application specific processors (ASICs), or one or more programmable logic devices (PLDs). In some cases, the processor core complex 12 may execute programs or instructions (e.g., an operating system or application program) stored on a suitable article of manufacture, such as the local memory 14 and/or the main memory storage device 16. In addition to instructions for the processor core complex 12, the local memory 14 and/or the main memory storage device 16 may also store data to be processed by the processor core complex 12. By way of example, the local memory 14 may include random access memory (RAM) and the main memory storage device 16 may include read only memory (ROM), rewritable non-volatile memory such as flash memory, hard drives, optical discs, or the like.

The electronic display 18 may display image frames, such as a graphical user interface (GUI) for an operating system or an application interface, still images, or video content. The processor core complex 12 may supply at least some of the image frames. The electronic display 18 may be a self-emissive display, such as an organic light emitting diodes (OLED) display, a micro-LED display, a micro-OLED type display, or a liquid crystal display (LCD) illuminated by a backlight. In some embodiments, the electronic display 18 may include a touch screen, which may allow users to interact with a user interface of the electronic device 10. The electronic display 18 may employ display panel sensing to identify operational variations of the electronic display 18. This may allow the processor core complex 12 to adjust image data that is sent to the electronic display 18 to compensate for these variations, thereby improving the quality of the image frames appearing on the electronic display 18.

The input structures 22 of the electronic device 10 may enable a user to interact with the electronic device 10 (e.g., pressing a button to increase or decrease a volume level). The I/O interface 24 may enable electronic device 10 to interface with various other electronic devices, as may the network interface 26. The network interface 26 may include, for example, interfaces for a personal area network (PAN), such as a Bluetooth network, for a local area network (LAN) or wireless local area network (WLAN), such as an 802.11x Wi-Fi network, and/or for a wide area network (WAN), such as a cellular network. The network interface 26 may also include interfaces for, for example, broadband fixed wireless access networks (WiMAX), mobile broadband wireless networks (mobile WiMAX), asynchronous digital subscriber lines (e.g., ADSL, VDSL), digital video broadcasting-terrestrial (DVB-T) and its extension DVB Handheld (DVB-H), ultra wideband (UWB), alternating current (AC) power lines, and so forth. The power source 29 may include any suitable source of power, such as a rechargeable lithium polymer (Li-poly) battery and/or an alternating current (AC) power converter.

In certain embodiments, the electronic device 10 may take the form of a computer, a portable electronic device, a wearable electronic device, or other type of electronic device. Such computers may include computers that are generally portable (such as laptop, notebook, and tablet computers) as well as computers that are generally used in one place (such as conventional desktop computers, workstations and/or servers). In certain embodiments, the electronic device 10 in the form of a computer may be a model of a MacBook®, MacBook® Pro, MacBook Air®, iMac®, Mac® mini, or Mac Pro® available from Apple Inc. of Cupertino, California By way of example, the electronic device 10, taking the form of a notebook computer 10A, is illustrated in FIG. 2 in accordance with one embodiment of the present disclosure. The depicted computer 10A may include a housing or enclosure 36, an electronic display 18, input structures 22, and ports of an I/O interface 24. In one embodiment, the input structures 22 (such as a keyboard and/or touchpad) may be used to interact with the computer 10A, such as to start, control, or operate a GUI or applications running on computer 10A. For example, a keyboard and/or touchpad may allow a user to navigate a user interface or application interface displayed on the electronic display 18.

FIG. 3 depicts a front view of a handheld device 10B, which represents one embodiment of the electronic device 10. The handheld device 10B may represent, for example, a portable phone, a media player, a personal data organizer, a handheld game platform, or any combination of such devices. By way of example, the handheld device 10B may be a model of an iPod® or iPhone® available from Apple Inc. The handheld device 10B may include an enclosure 36 to protect interior components from physical damage and to shield them from electromagnetic interference. The enclosure 36 may surround the electronic display 18. The I/O interfaces 24 may open through the enclosure 36 and may include, for example, an I/O port for a hard wired connection for charging and/or content manipulation using a standard connector and protocol, such as the Lightning connector provided by Apple Inc., a universal serial bus (USB), or other similar connector and protocol.

User input structures 22, in combination with the electronic display 18, may allow a user to control the handheld device 10B. For example, the input structures 22 may activate or deactivate the handheld device 10B, navigate user interface to a home screen, a user-configurable application screen, and/or activate a voice-recognition feature of the handheld device 10B. Other input structures 22 may provide volume control, or may toggle between vibrate and ring modes. The input structures 22 may also include a microphone may obtain a user's voice for various voice-related features, and a speaker may enable audio playback and/or certain phone capabilities. The input structures 22 may also include a headphone input may provide a connection to external speakers and/or headphones.

FIG. 4 depicts a front view of another handheld device 10C, which represents another embodiment of the electronic device 10. The handheld device 10C may represent, for example, a tablet computer or portable computing device. By way of example, the handheld device 10C may be a tablet-sized embodiment of the electronic device 10, which may be, for example, a model of an iPad® available from Apple Inc.

Turning to FIG. 5, a computer 10D may represent another embodiment of the electronic device 10 of FIG. 1. The computer 10D may be any computer, such as a desktop computer, a server, or a notebook computer, but may also be a standalone media player or video gaming machine. By way of example, the computer 10D may be an iMac®, a MacBook®, or other similar device by Apple Inc. It should be noted that the computer 10D may also represent a personal computer (PC) by another manufacturer. A similar enclosure 36 may be provided to protect and enclose internal components of the computer 10D such as the electronic display 18. In certain embodiments, a user of the computer 10D may interact with the computer 10D using various peripheral input devices, such as input structures 22A or 22B (e.g., keyboard and mouse), which may connect to the computer 10D.

Similarly, FIG. 6 depicts a wearable electronic device 10E representing another embodiment of the electronic device 10 of FIG. 1 that may be configured to operate using the techniques described herein. By way of example, the wearable electronic device 10E, which may include a wristband 43, may be an Apple Watch® by Apple, Inc. However, in other embodiments, the wearable electronic device 10E may include any wearable electronic device such as, for example, a wearable exercise monitoring device (e.g., pedometer, accelerometer, heart rate monitor), or other device by another manufacturer. The electronic display 18 of the wearable electronic device 10E may include a touch screen display 18 (e.g., LCD, OLED display, active-matrix organic light emitting diode (AMOLED) display, and so forth), as well as input structures 22, which may allow users to interact with a user interface of the wearable electronic device 10E.

Figure 7:
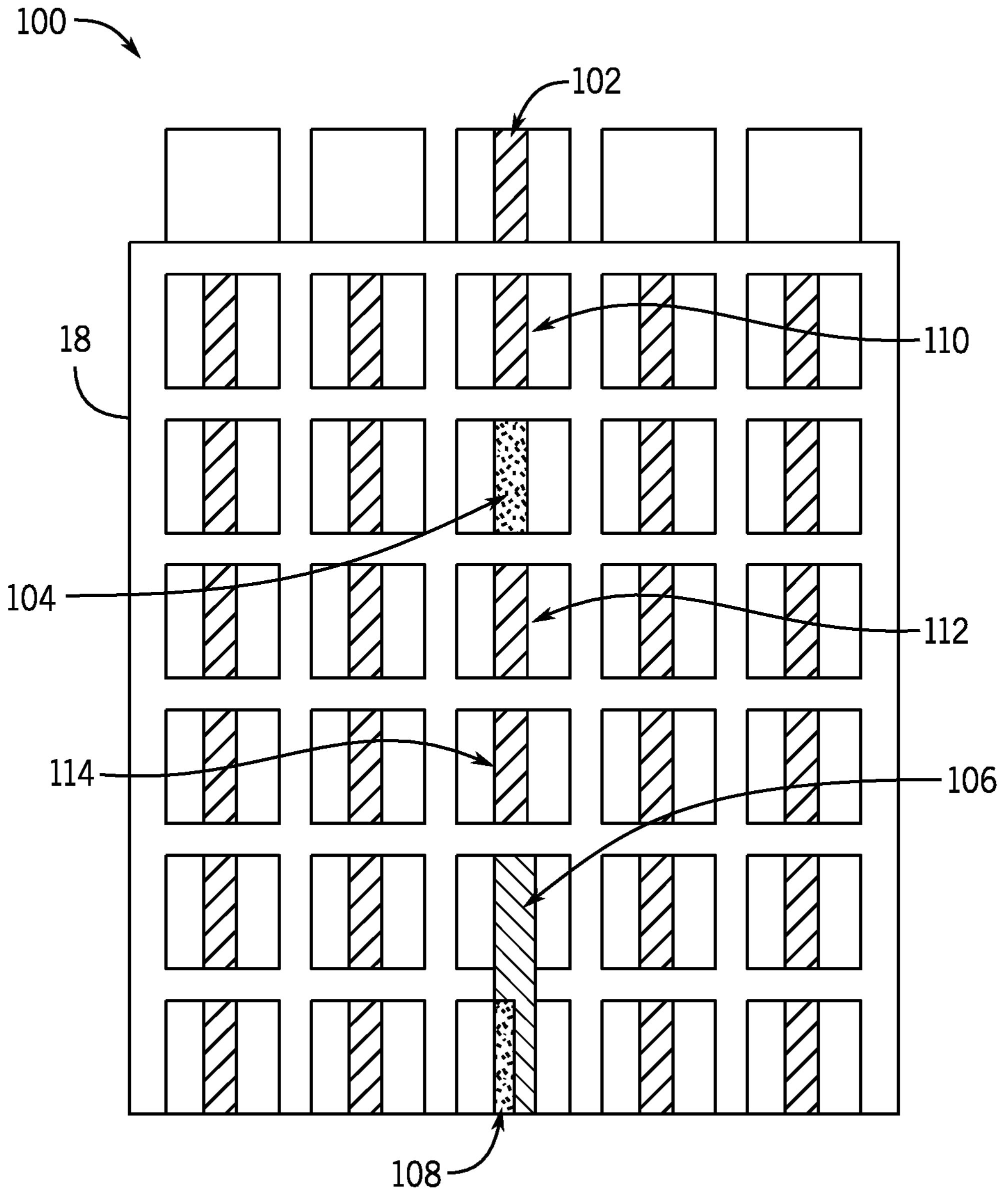
FIG. 7 is a diagram of the electronic display of FIG. 1 including at least one defective pixel, according to an embodiment of the present disclosure.

FIG. 7 illustrates a diagram 100 illustrating one manner of compensating for defective pixels in the electronic display 18. The electronic display 18 may include any number of pixels, such as pixels 102, 104, 106, 108, 110, 112, and 114. In certain embodiments, each pixel may include one or more sub-pixels (e.g., red sub-pixel, blue sub-pixel, green sub-pixel). Pixel 104 may be a defective pixel, such that pixel 104 may produce undesirable visual artifacts. For example, pixel 104 may emit light, gamma, or gray level at a differing level than a target level based on image data. In some embodiments, the pixel 104 may not emit any light. Pixel 102 may be a spare pixel. Current may be shifted from the pixel 104 to the pixel 102 or another pixel in the electronic display 18. In certain embodiments, pixel circuitry may supply image data to a defective pixel (e.g., pixel 108) that has defective pixel drive circuitry. In this case, the pixel 106 and the pixel 108 may be programmed with the same image data from the pixel drive circuitry of the pixel 106. In certain embodiments, the defective pixel may be a bright defective pixel, such that the defective pixel appears to be always on when viewed by a user. As such, pixel circuitry may turn off a bright defective pixel to reduce and/or eliminate undesirable visual artifacts associated with a bright defective pixel. In certain embodiments, the pixel circuitry may shunt a current to ground to turn off the defective pixel or may block the current from reaching a self-emissive element of the pixel (e.g., an LED, an OLED).

The pixel circuitry of an adjacent pixel may be used to supply image data to a defective pixel. In this case, the adjacent pixel may then be supplied image data by another adjacent pixel. In some embodiments, pixel circuitry for an adjacent pixel (e.g., pixel 106) may supply image data to a defective pixel (e.g., pixel 108) that has defective pixel circuitry. For example, the pixel 106 may be adjacent to pixel 108 and pixel circuitry of the pixel 106 may supply image data to pixel 108. As the pixel circuitry associated with pixel 106 is being used to supply image data to pixel 108, additional pixel circuitry may be needed to supply image data to pixel 106. For example, pixel 114 may be adjacent to pixel 106 and pixel circuitry of the pixel 114 may supply image data to pixel 106. As such, pixel circuitry of the pixel 112 may supply image data to pixel 114, pixel circuitry of the pixel 104 may supply image data to pixel 112, and pixel circuitry of the pixel 110 may supply image data to pixel 104. In some embodiments, the display 18 may include any number of spare pixels (e.g., pixel 102). As such, pixel circuitry of the pixel 102 may supply image data to pixel 110.

Figure 8:
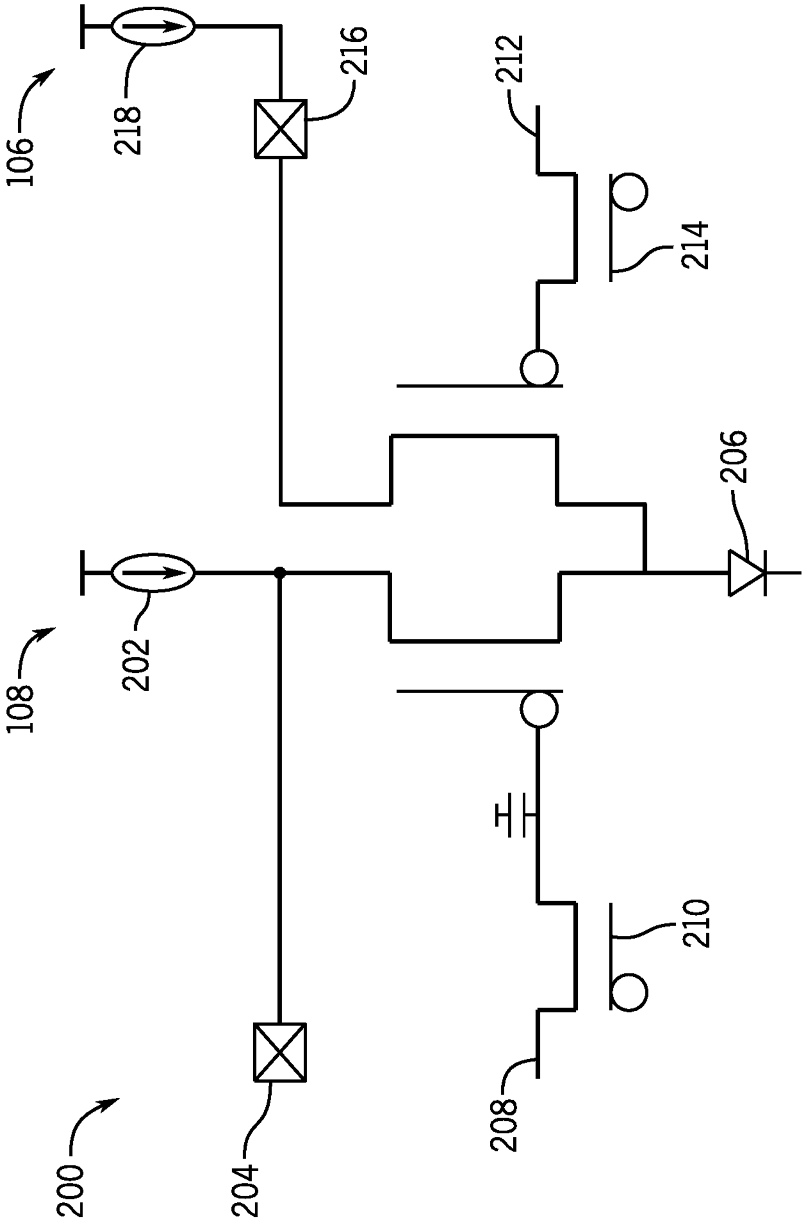
FIG. 8 is a circuit diagram of an example architecture for supplying data current to two or more pixels in an electronic display from a selectable pixel current drive circuitry, according to an embodiment of the present disclosure.

FIG. 8 is a circuit diagram of an example architecture 200 for programming two or more pixels with the same image data when one of those pixels has defective pixel drive circuitry. The architecture 200 may include pixel circuitry including any number of components, such as a selectable pixel drive circuitry 202 that may provide a data current to any number of components, such as an OLED 206, or an OLED of a lower adjacent pixel that may be coupled to a connection 204. The connection 204 may couple the pixel 108 and the pixel drive circuitry 202 to the lower adjacent pixel. The pixel drive circuitry 202, in normal operation, provides a data current that causes an OLED 206 to emit light according to the amount of current. Similarly, while in normal operation of the architecture 200, pixel drive circuitry 218 of the pixel 106 may provide data current to an additional low adjacent pixel coupled to connection 216, the architecture 200 may enable the pixel drive circuitry 218 of pixel 106 to supply current to the OLED 206 based on a selection signal 210 and/or a selection signal 214. For instance, in normal operation, the selection signal 210 may be HIGH and the selection signal 214 may be LOW, thus the pixel drive circuitry 202 may provide the data current to the OLED 206. However, if the pixel drive circuitry 202 is defective, the selection signal 214 may be set to HIGH and the selection signal 210 may be set to LOW, and the pixel drive circuitry 218 of the pixel 106 may provide a data current to the OLED 206 and/or to an OLED of the additional low adjacent pixel (not shown) coupled to the connection 216. Under other conditions, if the pixel drive circuitry 202 is not defective, but a pixel drive circuitry of the lower adjacent pixel coupled to the pixel drive circuitry 202 via the connection 204 is defective, the pixel drive circuitry 202 may supply image data to the OLED 206 of the pixel 108 and to an OLED of the lower adjacent pixel coupled to the connection 204 (not shown). In the architecture 200, the pixel circuitry may also block a defective OLED (e.g., may block the OLED 206 if the OLED 206 were defective) from receiving the data current from the pixel drive circuitry 202.

Figure 9:
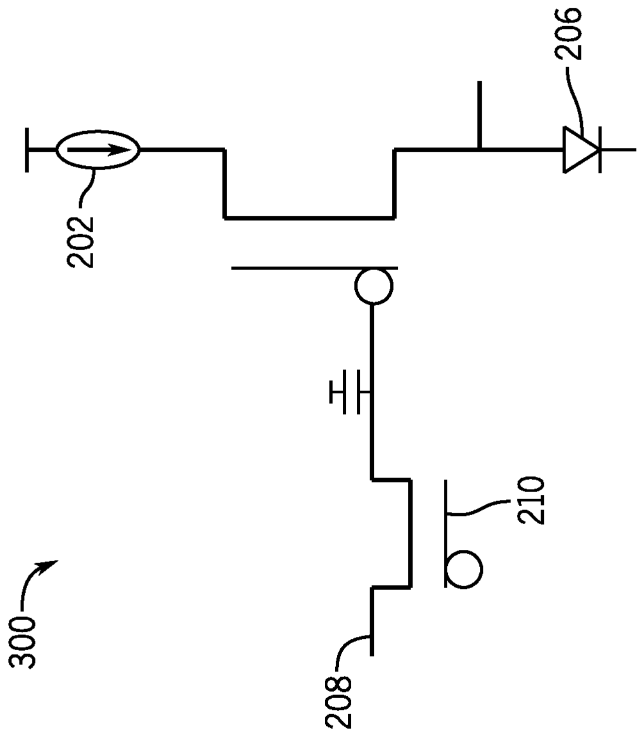
FIG. 9 is a circuit diagram of an example architecture for turning off a defective pixel in an electronic display, according to an embodiment of the present disclosure.

FIG. 9 is a circuit diagram of an example architecture 300 for blocking image data to a defective pixel in an electronic display, in accordance with an embodiment of the present disclosure. The architecture 300 may include pixel circuitry, such as selectable pixel current drive circuitry 202, that provides a data current for the pixel (e.g., that causes an OLED 206 to emit light according to the amount of current) based on image data 208. In the architecture 300, signal routing circuitry of the pixel may prevent a bright defective pixel from illuminating during display by blocking the image data 208 from passing to the pixel based on a select signal 210.

Figure 10:
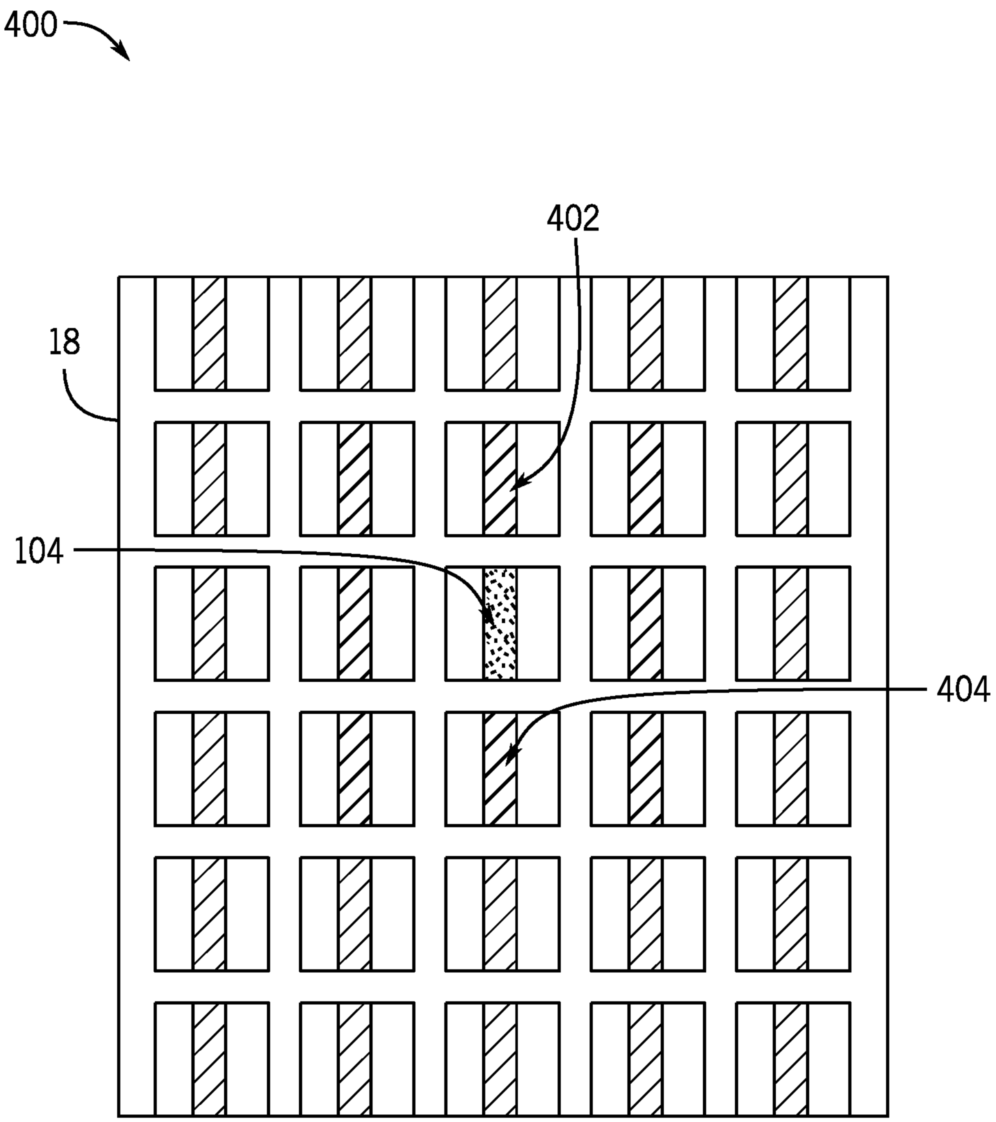
FIG. 10 is a diagram of the electronic display of FIG. 1 including at least one defective pixel and a set of adjacent pixels, according to an embodiment of the present disclosure.

FIG. 10 is a diagram 400 of the electronic display 18 including a defective pixel 104 and one or more adjacent pixels 402, 404. In certain embodiments, the one or more adjacent pixels 402, 404 may be disposed in a same column or row of the defective pixel 104. In some instances, the defective pixel 104 may be a bright defective pixel or a dead pixel. As such, signal routing circuitry of the pixel circuitry may shunt a current to ground or block the current from reaching a self-emissive element of the pixel to turn off the bright defective pixel 104. Additionally, the pixel circuitry may distribute image data (e.g., compensation voltage) originally intended for the defective pixel 104 to one or more adjacent pixels 402, 404 to increase a brightness of the one or more adjacent pixels. As such, the brightened pixel may reduce or eliminate undesirable visual artifacts resulting from defective operation of the defective pixel. The brightness that would otherwise have been intended for the defective pixel 104 may be effectively distributed during the preparation of the image data in the processor core complex 12 or other image processing circuitry of the electronic device 10. For example, the processor core complex 12 or other image processing circuitry of the electronic device 10 may adjust the brightness of image data of certain surrounding pixels (e.g., the eight nearest-neighbor pixels of the same color component as the defective pixel 104) by distributing the brightness that would otherwise have been bound for the defective pixel 104. In this way, the total brightness of the area around the defective pixel 104 may appear to be the same as that which otherwise would have been emitted had the pixel 104 not been defective. In other words, the human eye may effectively see a spatially averaged brightness around the defective pixel 104 that appears to be the same as it would otherwise have been seen if the defective pixel 104 were functioning normally.

Figure 11:
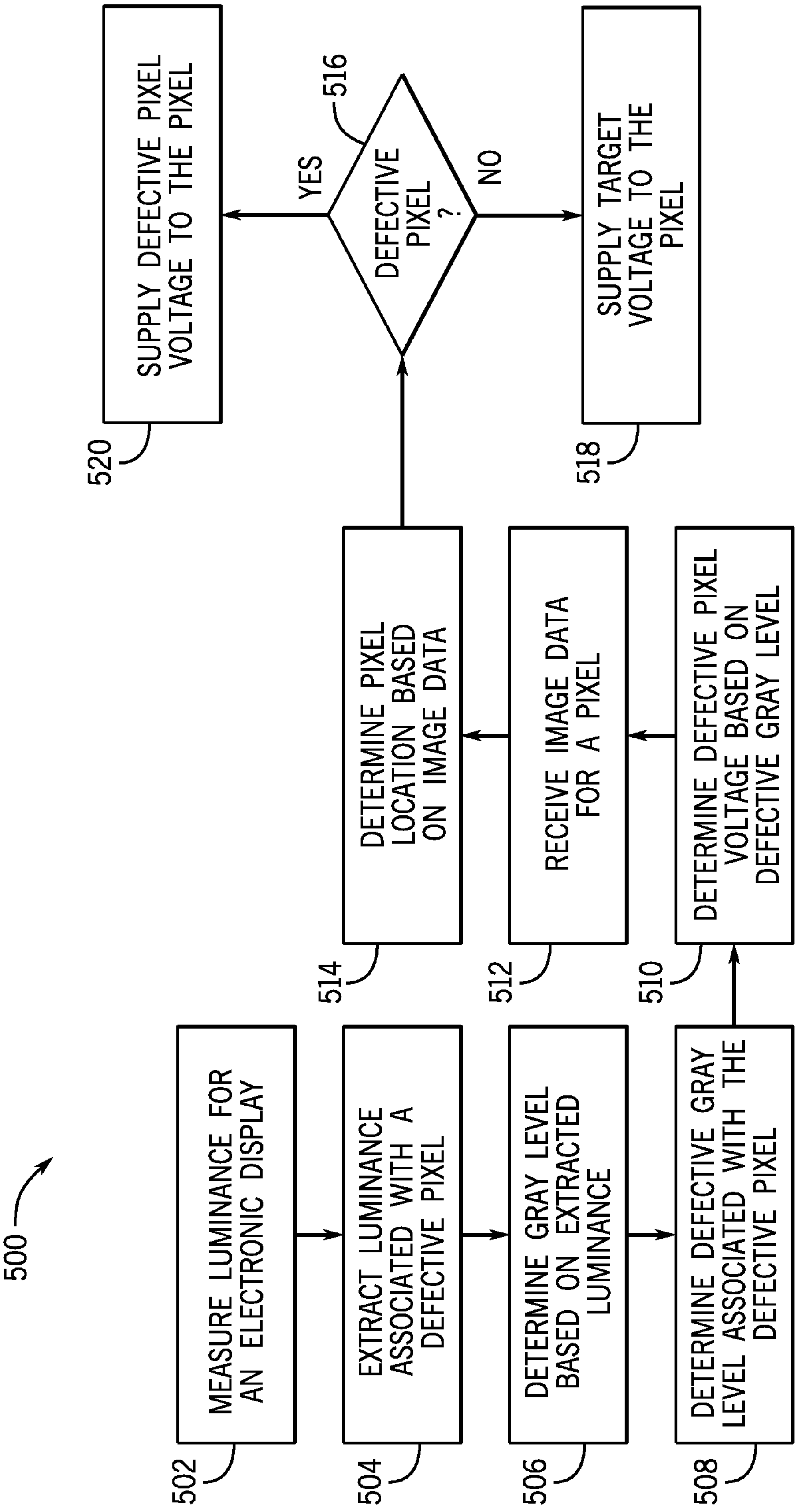
FIG. 11 is a flow chart depicting operations for calibrating an electronic display with a defective pixel, according to an embodiment of the present disclosure.

FIG. 11 is a flow chart depicting operations to operate defective pixels in an electronic display, according to an embodiment. The operations depicted in the flow chart 500 may be performed or executed by one or more components of the electronic device 10, such as pixel circuitry or the processor core complex 12, as well as any suitable calibration tools (e.g., cameras and computers) during device manufacture. The flow chart may also be performed by any suitable processor that controls operational parameters of the electronic display 18. Furthermore, certain described actions may be implemented by executing instructions stored in a memory, using any suitable processing circuitry. In some embodiments, the memory may include one or more tangible, non-transitory computer-readable media that store instructions executable by any suitable processing circuitry and/or data to be processed by any suitable processing circuitry. For example, the memory may include random access memory (RAM), read only memory (ROM), rewritable non-volatile memory, such as flash memory, hard drives, optical discs, and/or the like. Moreover, although the following description of the method is described in a particular order, it should be noted that the flow chart may be performed in any suitable order. The flow chart may include one or more operations corresponding to operation of defective pixels discussed with respect to FIGS. 7-10. For example, the pixel circuitry may operate defective pixels with image data corresponding to a defective pixel such that the defective pixel may display adjusted image data to counteract and, thus, reduce or eliminate visual artifacts.

At block 502, processing circuitry, such as processor core complex 12 or any suitable calibration tools, may measure and/or may receive a measurement of luminance associated with a set of pixels in an electronic display, such as electronic display 18. Any suitable parameters that can distinguish the behavior of various pixels of the electronic display may be used. For example, a camera may measure a luminance of the electronic display when the electronic display is programmed with test image data (e.g., all pixels having a particular gray level). Additionally or alternatively, test circuitry on the electronic display may identify which pixels are not operating normally (e.g., current or voltage is too high or too low at certain pixels). At block 504, the processing circuitry may extract a luminance level associated with a defective pixel. In certain embodiments, the processing circuitry may compare a measured defective luminance associated with a defective pixel and a measured luminance associated with a working (e.g., non-defective pixel) and, at step 506, may scale the measured defective luminance towards an absolute luminance level based on the comparison. For example, the processing circuitry may receive a location of the defective pixel within the electronic display and may extract a luminance associated with the defective pixel based on the captured luminance for the electronic display. In some embodiments, the electronic display may include any suitable number of defective pixels and the processing circuitry may receive a corresponding location for each defective pixel. As such, the processing circuitry may extract one or more measured parameters (e.g., luminance) for each defective pixel.

At block 508, the processing circuitry may determine a defective gray level associated with a defective pixel based on the extracted luminance. In certain embodiments, the processing circuitry may determine the gray level based on an absolute luminance value after scaling the measured defective luminance associated with the defective pixel. For example, the processing circuitry may compare a luminance associated with the defective pixel and a gray level associated with the defective pixel and may generate a graph of luminance and gray level for the defective pixel. In some embodiments, the luminance-gray level graph for a defective pixel may be compared to an expected luminance-gray level graph for a working (e.g., non-defective) pixel. As such, the processing circuitry may determine a gray level change (e.g., the difference between a defective gray level associated with the defective pixel and a gray level associated with a working pixel) associated with each defective pixel of the electronic display.

At block 510, the processing circuitry may determine defective pixel voltages based on the defective gray levels and may generate a voltage mapping for at least one defective pixel based on the defective pixel voltages. As such, the processing circuitry may utilize the measured luminance to generate a mapping between a target voltage associated with a non-defective pixel and a defective pixel voltage associated with a defective pixel, such that the pixel circuitry may reduce and/or eliminate undesirable visual artifacts by supplying the defective pixel voltage to the defective pixel. For example, the defective pixel voltage may cause the defective pixel to display image data similar to a non-defective pixel being supplied standard image data voltage. In some embodiments, the processing circuitry may compare defective pixel voltage values associated with a defective pixel and target voltage values associated with a non-defective pixel. For example, the processing circuitry may determine a defective pixel voltage value corresponding to a target voltage value such that the defective pixel emits light, gamma, or gray level similar to the target voltage value being supplied to the non-defective pixel. As such, the pixel circuitry may supply the defective pixel voltage value to the defective pixel to reduce and/or eliminate undesirable visual artifacts during operation of the defective pixel. The voltage mapping may include a set target voltage values and a set of corresponding defective pixel voltage values, such that each target voltage value may include a corresponding defective pixel voltage value. Additionally or alternatively, the voltage mapping may be a look-up table and the processing circuitry may store the locations of one or more defective pixels, the voltage mapping, or a combination thereof. As such, the pixel circuitry may access the look-up table to determine locations of defective pixels and determine defective pixel voltages based on the locations of the defective pixels. The look-up table may be stored in a memory, such as memory 14, based on a calibration of the electronic display 18, such as at the factory during manufacture of the electronic display 18.

Blocks 512, 514, 516, 518, and 520 may take place after the electronic display 18 has been manufactured. At block 512, the processor core complex or the electronic display may prepare or receive image data for a pixel. The processor core complex or the electronic display may adjust the image data according to the calibration of blocks 502-510 if the pixel is defective. In one example, the processor core complex may provide a gain to the pixel depending on its location in a defective pixel position. In another example, the electronic display may convert the image data to a target voltage to be supplied to a corresponding pixel. In some embodiments, the electronic display may receive image data for a number of pixels. At block 514, the processor core complex or the electronic display may determine a pixel location based on the image data and, at decision block 516, the processor core complex or the electronic display may determine whether the pixel location corresponds to a defective pixel. If not, a normal target voltage according to the image data for the pixel is provided to the pixel (block 518). If yes, however, the processor core complex or the electronic display adjust the pixel value (e.g., to a different value of image data or to a different voltage) before sending the image data to the pixel (block 520). For instance, the processor core complex may adjust the image data, or the electronic display may apply a different gamma or may provide an additional voltage correction according to the calibration discussed above.

In certain embodiments, the pixel circuitry may shunt a current intended to be supplied to the defective pixel to ground. For example, the defective pixel may be a bright defective pixel and the pixel circuitry may shunt the current to ground to prevent the bright defective pixel from illuminating during display. As a result, the pixel circuitry may turn off the bright defective pixel. Additionally or alternatively, the pixel circuitry may bypass a defective pixel and may route pixel data (e.g., target voltage, defective pixel voltage) to more than one pixel (e.g., two, three, or more).

Figure 12:
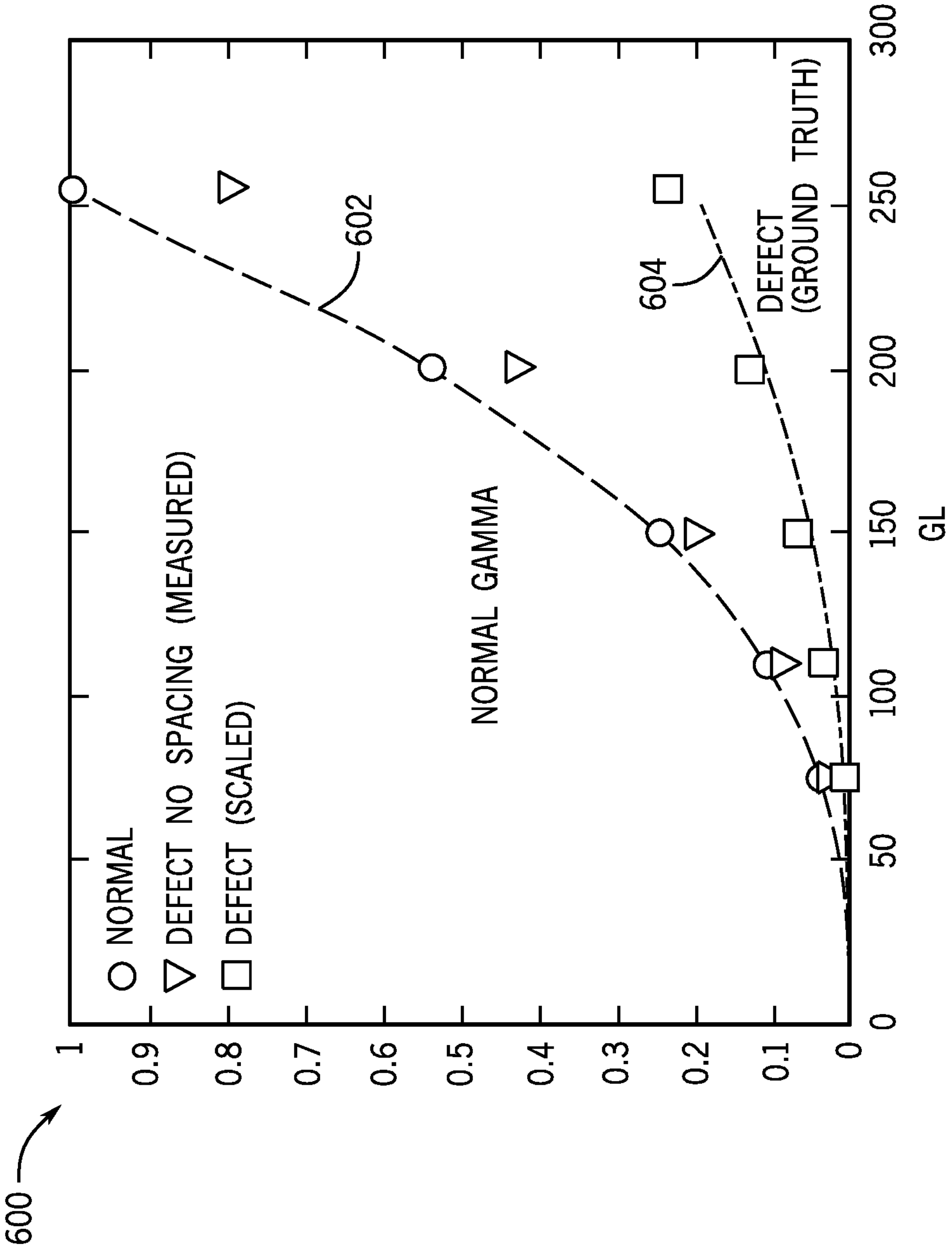
FIG. 12 is a graph for compensating a defective pixel, according to an embodiment of the present disclosure.

With the foregoing in mind, FIG. 12 illustrates a graph 600 for a set of luminance and gray level curves for defective and non-defective pixels, in accordance with an embodiment of the present disclosure. The graph 600 includes a curve 602 corresponding to a working (e.g., non-defective pixel) and a curve 604 corresponding to a defective pixel. In certain embodiments, the processing circuitry may utilize the curves 602, 604 to determine a defective pixel voltage to supply to a defective pixel. For example, the pixel circuitry may determine a difference in luminance between a working pixel and a defective pixel at the same gray level based on the curves 602, 604. For example, a measured luminance level associated with a defective pixel may be scaled to an absolute luminance level in accordance with the graph 600 of FIG. 12 to determine a change in voltage that would cause the defective pixel to behave more like a non-defective pixel.

Figure 13:
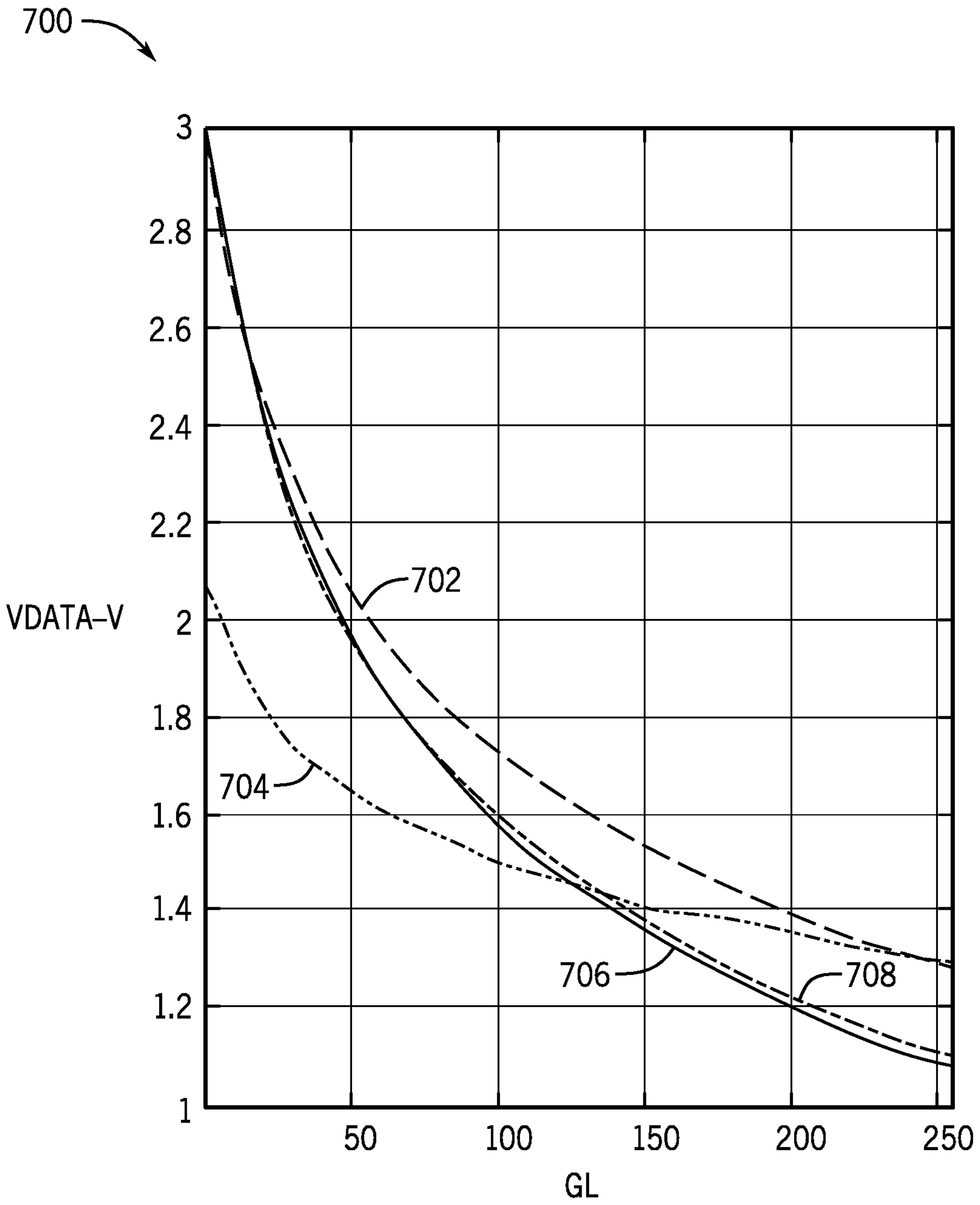
FIG. 13 is a graph for identifying a defective pixel, according to an embodiment of the present disclosure.

With the foregoing in mind, FIG. 13 illustrates a graph 700 for a set of voltage and gray level curves for defective and non-defective pixels, in accordance with an embodiment of the present disclosure. The graph 700 includes a voltage-gray level curve 702 corresponding to a working (e.g., non-defective) pixel and voltage-gray level curves 704, 706, 708 corresponding to respective defective pixels. Each voltage-gray level curve corresponding to a defective pixel may be associated with a particular defect associated with a pixel. In certain embodiments, the electronic display 18 or the processor core complex 12 may use the graph 700 to perform a comparison between a measured and/or determined voltage-gray level curve and any of the voltage-gray level curves 702, 704, 706, 708. As such, the electronic display 18 or the processor core complex 12 may determine a defective pixel voltage to supply to a defective pixel.

Figure 14:
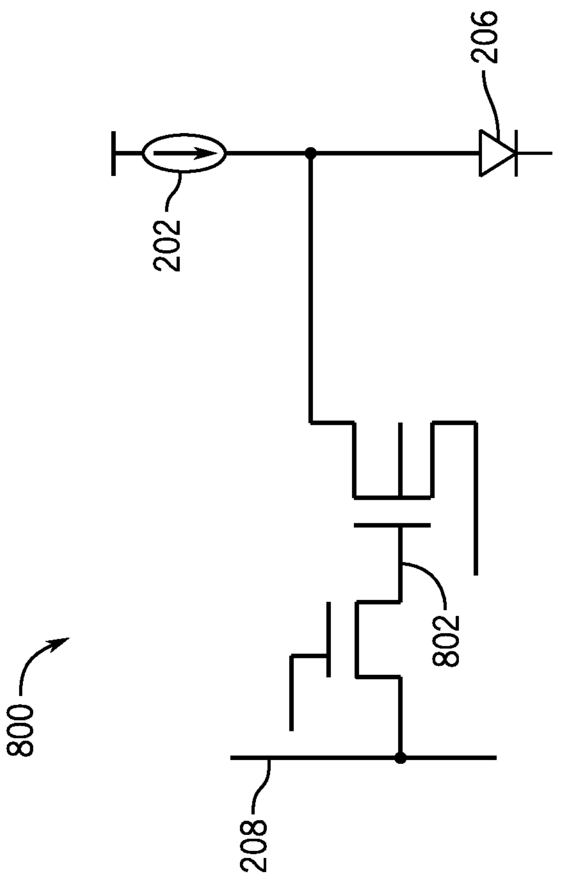
FIG. 14 is a circuit diagram of an example architecture for shunting a defective pixel, in accordance with an embodiment of the present disclosure.

FIG. 14 is a circuit diagram of an example architecture 800 for shunting a defective pixel, in accordance with an embodiment of the present disclosure. The architecture 800 may include pixel circuitry, such as the selectable pixel current drive circuitry 202 that provides a data current for a pixel 206 based on image data 208. The signal routing circuitry of the pixel circuitry may prevent a bright defective pixel from illuminating during display by shunting the data current to ground. The architecture 800 may include a shared reset signal 802 that may reset the pixel to a known state.

Figure 15:
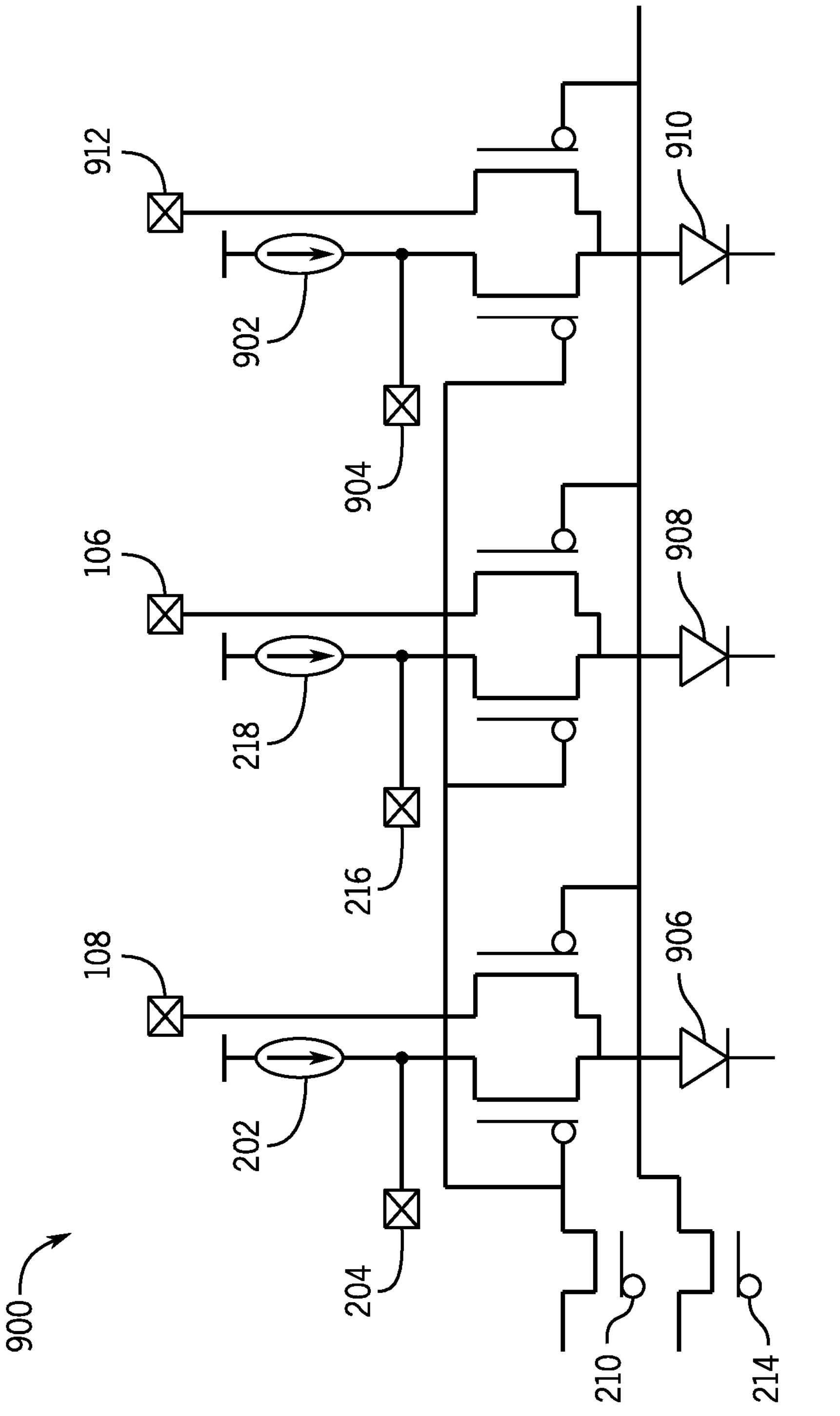
FIG. 15 is a circuit diagram of an example architecture for supplying data current to two or more pixels in an electronic display from a selectable pixel current drive circuitry, according to an embodiment of the present disclosure.

FIG. 15 is a circuit diagram of an example architecture 900 for programming two or more pixels in an electronic display, such as the electronic display 18, with the same image data. The architecture 900 may include pixel circuitry including any number of components, such as a selectable pixel current drive circuitry 202 that provides a data current for the pixel (e.g., that causes the pixel to emit light according to the amount of current). Additionally or alternatively, the architecture 900 may include any number of pixels and each pixel may include any number of color components, such as color components 906, 908, 910. The architecture 900 may include pixel circuitry including any number of components, such as a selectable pixel current drive circuitry 202 that, in normal operation, provides a data current for the pixel (e.g., that causes a color component 906 to emit light according to the amount of current). In the architecture 900, the signal routing circuitry of the pixel circuitry may route around a defective pixel and the selectable pixel current drive circuitry 202 may supply a data current to two or more color components corresponding to the same image data. In the example of FIG. 15, all of the color components of a particular pixel are controlled together (e.g., all of the color components of a pixel may be supplied by other pixels). Thus, when one of the color components of a pixel is defective, an entire pixel (all three color components) may be replicated from pixel drive circuitry of the respective color components of another pixel. Additionally or alternatively, the example of FIG. 15 illustrates that the pixel 106 may use its signal routing circuitry to supply image data to the color component 908 when the pixel drive circuitry 218 is defective based on a select signal 214, the pixel 108 may use its signal routing circuitry to supply image data to the color component 906 when the pixel drive circuitry 202 is defective based on the select signal 214, and/or the pixel 912 may use its signal routing circuitry to supply image data to the color component 910 when the pixel drive circuitry 902 is defective based on the select signal 214. If the pixel drive circuitry 218 is not defective, but pixel drive circuitry of the lower adjacent pixel 216 is defective, the pixel drive circuitry 218 may supply image data to the color component 908 of the pixel and to a color component (not shown) of the lower adjacent pixel 216 based on a select signal 210. If the pixel drive circuitry 202 is not defective, but pixel drive circuitry of the lower adjacent pixel 204 is defective, the pixel drive circuitry 202 may supply image data to the color component 906 of the pixel and to a color component (not shown) of the lower adjacent pixel 204 based on the select signal 210. If the pixel drive circuitry 902 is not defective, but pixel drive circuitry of the lower adjacent pixel 904 is defective, the pixel drive circuitry 902 may supply image data to the color component 910 of the pixel and to a color component (not shown) of the lower adjacent pixel 904 based on the select signal 210. In the architecture 900, the pixel circuitry may also block a defective color component (e.g., may block the color component 906 if the color component 906 were defective) from receiving the data current from the pixel drive circuitry 202.

Figure 16:
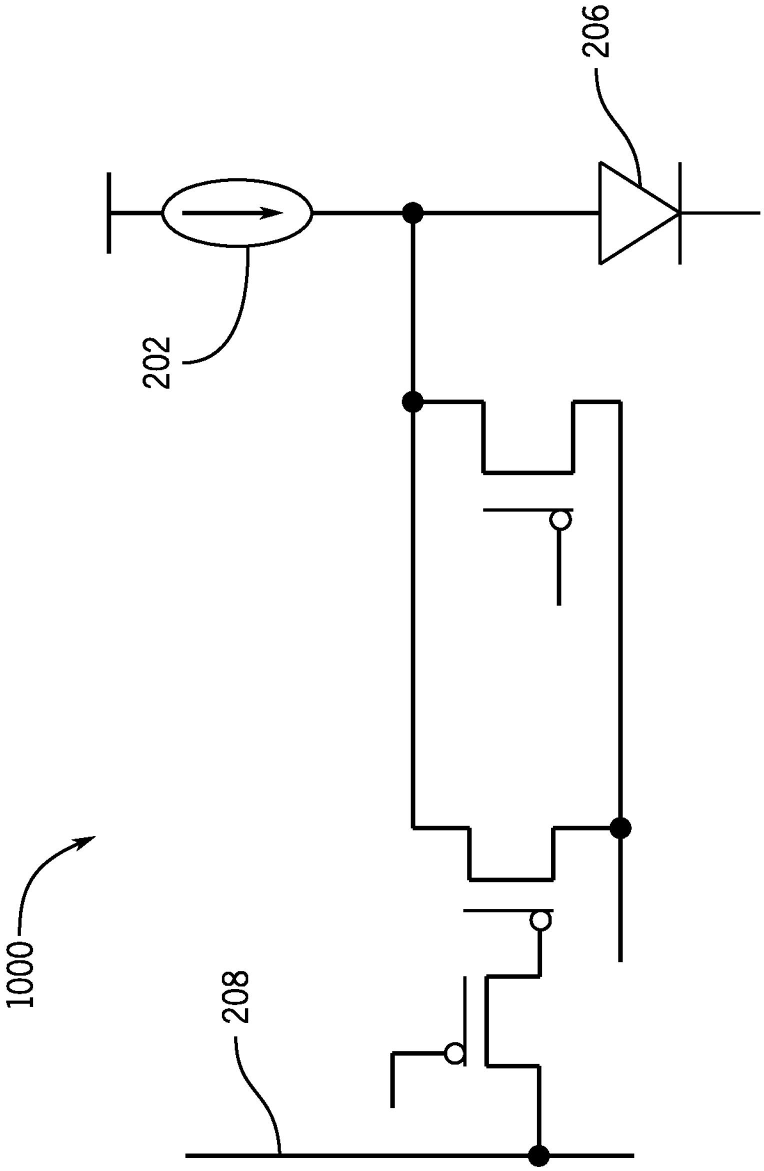
FIG. 16 is a circuit diagram of an example architecture for shunting a defective pixel in an electronic display, according to an embodiment of the present disclosure.

FIG. 16 is a circuit diagram of an example architecture 1000 for shunting a defective pixel in an electronic display, according to an embodiment of the present disclosure. The architecture 1000 may include pixel circuitry, such as the selectable pixel current drive circuitry 202. The signal routing circuitry of the pixel circuitry supplies a data current for a pixel 206 based on image data 208 and the signal routing circuitry of the pixel circuitry may prevent a bright defective pixel from illuminating during display by shunting the data current to ground.

Figure 17:
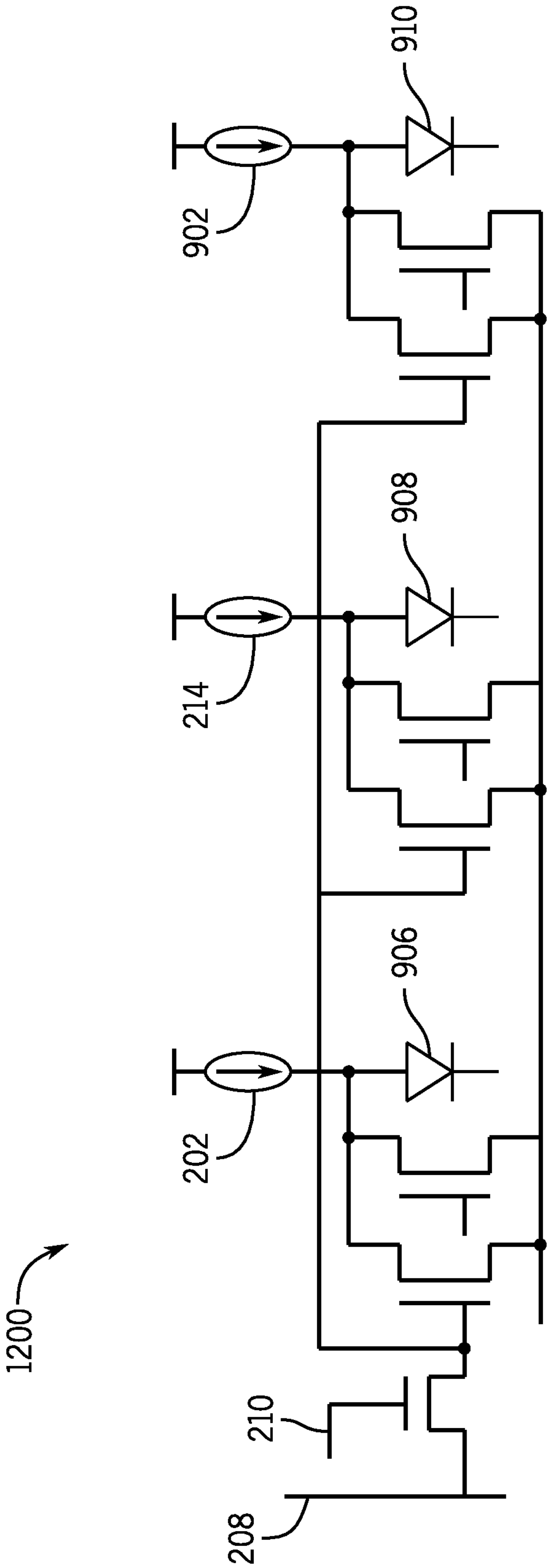
FIG. 17 is a circuit diagram of another example architecture for shunting a defective pixel in an electronic display, according to an embodiment of the present disclosure.

FIG. 17 is a circuit diagram of an example architecture 1200 for shunting a defective pixel in an electronic display, according to an embodiment of the present disclosure. The architecture 900 may include pixel circuitry, such as the selectable pixel current drive circuitries 202, 218, 902, that supply data currents based on image data 208 for corresponding color components 906, 908, 910. The signal routing circuitry of the pixel circuitry may prevent a bright defective pixel from illuminating during display by shunting the data current to ground based on a select signal 210 for all color components of a pixel when one is defective. By shunting all color components to ground, an entire RGB pixel may be turned off if even one of the color components is defective.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ," it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. An electronic display comprising:

a plurality of pixels respectively comprising:

a self-emissive element;

pixel drive circuitry configured to supply a pixel drive current to drive the self-emissive element; and signal routing circuitry comprising one or more selection circuits configured to reduce or eliminate a visual artifact due to a defective pixel among the plurality of pixels by:

receiving image data from other pixel drive circuitry associated with a first adjacent pixel or a second adjacent pixel based on a selection via the one or more selection circuits, wherein the other pixel drive circuitry is configured to supply, upon the selection via the one or more selection circuits, a second pixel drive current to drive the self-emissive element and a second self-emissive element.

2. The electronic display of claim 1, wherein the signal routing circuitry of a first pixel of the plurality of pixels is configured to turn off the self-emissive element of the first pixel by shunting the pixel drive current to ground when the first pixel is the defective pixel.

3. The electronic display of claim 1, wherein the signal routing circuitry of a first pixel of the plurality of pixels is configured to turn off the self-emissive element of the first pixel by blocking the pixel drive current from reaching the self-emissive element of the first pixel when the first pixel is the defective pixel.

4. The electronic display of claim 1, wherein the signal routing circuitry of three adjacent pixels of the plurality of pixels are configured to turn off the self-emissive elements of the three adjacent pixels when at least one of the three adjacent pixels is defective.

5. The electronic display of claim 4, wherein the three adjacent pixels have self-emissive elements of three different respective colors.

6. The electronic display of claim 5, wherein the signal routing circuitry of the three adjacent pixels of the plurality of pixels are configured to shunt three respective pixel drive currents of the three adjacent pixels to ground when at least one of the self-emissive elements of the three adjacent pixels is defective.

7. The electronic display of claim 6, wherein the signal routing circuitry of the three adjacent pixels of the plurality of pixels are configured to block three respective pixel drive currents of the three adjacent pixels from reaching the respective self-emissive elements of the three adjacent pixels when at least one of the self-emissive elements of the three adjacent pixels is defective.

8. The electronic display of claim 1, wherein the signal routing circuitry of a first pixel of the plurality of pixels is configured to supply image data to the second self-emissive element of a second pixel when the pixel drive circuitry of the second pixel is defective.

9. The electronic display of claim 1, wherein the signal routing circuitry of three adjacent pixels of different colors of the plurality of pixels are configured to supply image data to respective self-emissive elements of three other adjacent pixels having the same respective colors when the pixel drive circuitry of one of the three other adjacent pixels is defective.

10. The electronic display of claim 1, wherein the signal routing circuitry of a first pixel of the plurality of pixels is configured to receive image data from the first adjacent pixel when the pixel drive circuitry of the first pixel is defective.

11. A method of calibrating an electronic display, comprising:

measuring luminance of the electronic display while test data is being displayed;

determining a luminance difference in the measured luminance of the electronic display between a defective pixel of the electronic display and non-defective pixels of the electronic display;

determining a defective gray level of the defective pixel based on the luminance difference;

determining a defective pixel voltage of the defective pixel based on the defective gray level of the defective pixel; and receiving image data from pixel drive circuitry associated with an adjacent pixel based on a selection via selection circuitry, wherein the pixel drive circuitry is configured to supply, upon the selection via the selection circuitry, a pixel drive current to drive a self-emissive element of the defective pixel.

12. The method of claim 11, comprising determining a location of the defective pixel before determining the luminance difference.

13. The method of claim 11, comprising determining an additional defective pixel and shunting additional pixel data to be received by the additional defective pixel to ground based on the defective pixel voltage, wherein shunting the additional pixel data to be received by the additional defective pixel to ground comprises shunting one or more color components of the additional defective pixel to ground.

14. The method of claim 13, wherein the one or more color components comprise three color components.

15. The method of claim 13, wherein shunting the additional pixel data is based on selection of a select signal.

16. An article of manufacture comprising one or more tangible, non-transitory, computer-readable media comprising instructions to:

receive or generate image data for an electronic display that has a defective pixel;

receive image data from pixel drive circuitry associated with a non-defective pixel adjacent to the defective pixel based on a selection via selection circuitry associated with the pixel drive circuitry; and supply, via the pixel drive circuitry, a pixel drive current to drive a self-emissive element of the defective pixel upon selection via the selection circuitry.

17. The article of manufacture of claim 16, wherein the non-transitory computer-readable media comprises instructions to adjust additional image data to be received by other nearby pixels of a same color component as the defective pixel.

18. The article of manufacture of claim 17, wherein the other nearby pixels comprise nearest-neighbor pixels of the same color component as the defective pixel.

19. The article of manufacture of claim 16, wherein additional image data associated with an additional defective pixel is adjusted by scaling the additional image data associated with the additional defective pixel to darken the additional defective pixel when the additional defective pixel is a defective bright pixel.

20. The article of manufacture of claim 19, wherein scaling the additional image data comprises scaling the additional image data to 0.

* * * * *